No. 785,719. Patented March 28, 1905.

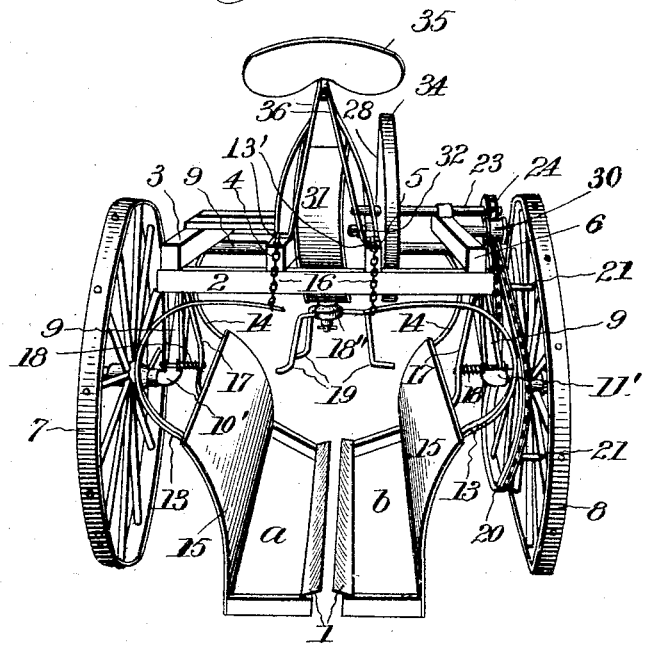

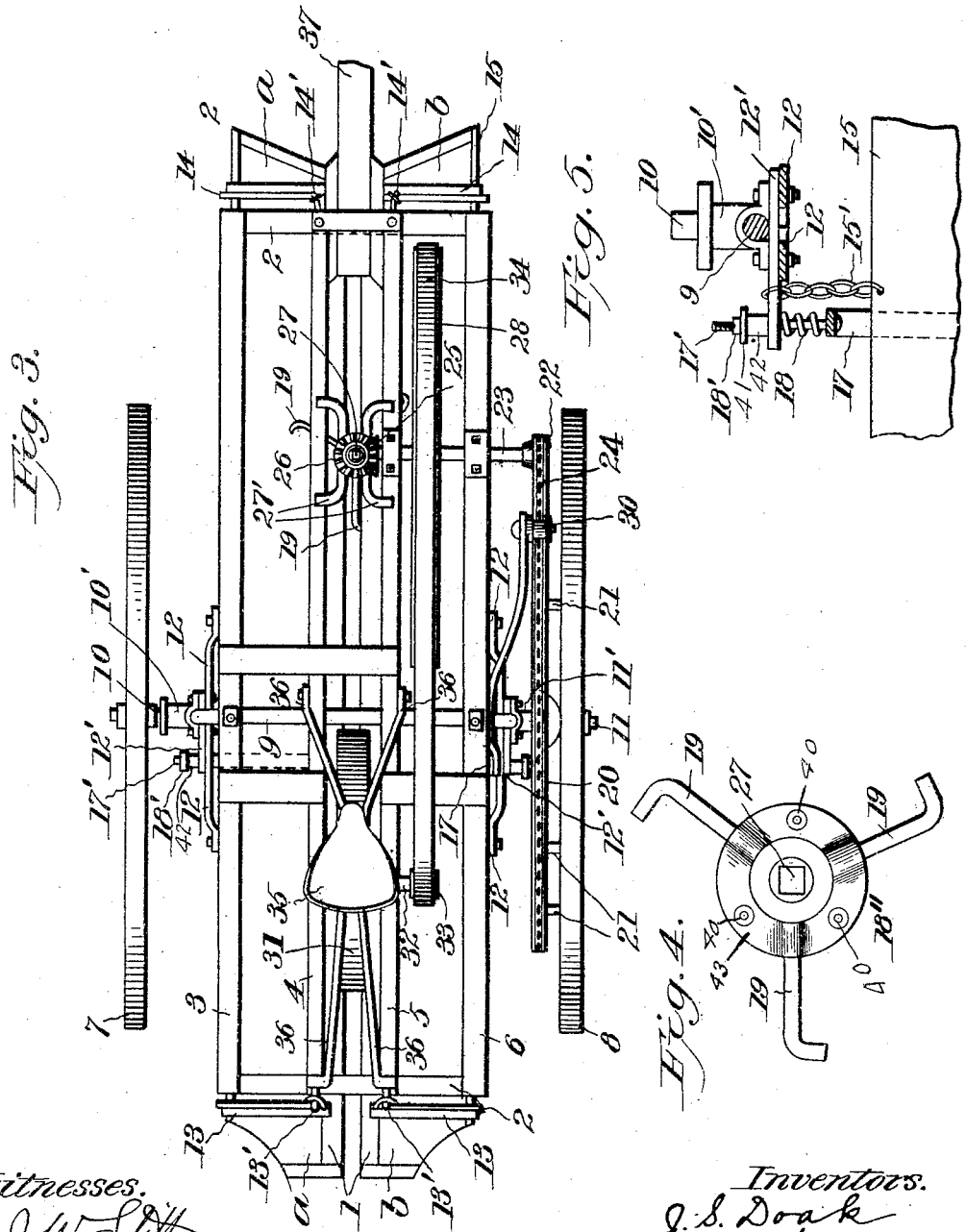

UNITED STATES PATENT OFFICE.

JOHN S. DOAK, OF BROWNWOOD, AND ALEXANDER G. FARRINGTON, OF YOAKUM, TEXAS.

BOLL-WEEVIL OR OTHER INSECT DESTROYER.

SPECIFICATION forming part of Letters Patent No. 785,719, dated March 28, 1905.

Application filed April 11, 1904. Serial No. 202,649.

*To all whom it may concern:*

Be it known that we, JOHN S. DOAK, of Brownwood, and ALEXANDER G. FARRINGTON, of Yoakum, Texas, have invented certain new and useful Improvements in Boll-Weevil or other Insect Destroyers, of which the following is a specification.

This invention relates to insect-destroyers, and more particularly to means for destroying boll-weevils which destroy bolls of cotton on stalks before the bolls of cotton mature; and the object is to improve the machine set forth in the patent granted to us on April 1, 1902, No. 696,419. The same machine will destroy grasshoppers, millers which produce the army-worms which devour cotton-plants, the army-worms themselves, potato-bugs, and other insects.

Another object is to produce a machine which will be entirely efficient for the purpose and which can be sold cheap enough to enable farmers to make use of such machines.

Other objects and advantages will be fully explained in the following description, and the invention will be more particularly pointed out in the claims.

Reference is had to the accompanying drawings, which form a part of this application and specification.

Figure 1 is a rear elevation of the machine in perspective. Fig. 2 is a perspective view of the machine, showing principally the side of the machine. Fig. 3 is a plan view. Fig. 4 is a detail view of the agitator for shaking the cotton. Fig. 5 is a broken sectional view illustrating the manner of attaching the braces to the axle, the view being a broken plan view.

Similar characters of reference are used to indicate the same parts throughout the several views.

Our invention consists of one or more pairs of troughs in which is placed a liquid or some liquids which kill the insects when the insects are thrown in the liquid and of means for throwing insects off of the plants into the liquid. The troughs *a* and *b* constitute a pair of troughs, which are to be passed under the branches of the stalks of growing plants, one trough on each side of the stalks and close to the stalks as may be practical, so that there will be a small space between the troughs. The smaller the space between the troughs the fewer insects will fall between the troughs to the ground. In order to prevent the troughs from injuring the stalks, we have provided yielding strips 1, which are attached to the inner edges of the trough and inclined, so that insects falling on the strips will slide or fall into the troughs. Means are provided for passing these troughs under the cotton-plants. The means for accomplishing this object is preferably a wheeled truck. A frame consisting of cross-beams 2 and longitudinal beams 3, 4, 5, and 6, attached to beams 2, is provided with wheels 7 and 8, which are provided with an arched axle 9. The frame is mounted on the axle 9, which is attached to the frame-pieces 3 and 6. The frame is further supported by braces 12, which are attached to the frame-pieces 3 and 6 and to the axle 9 near the spindles 10 and 11. The braces 12 are attached to the spindles 10 and 11 by means of castings 10' and 11' and by bars 12', castings 10' and 11' having flanges to which the bars 12' are bolted, and the same bolts extend through the braces 12. The castings 10' and 11' engage the axle 9 at the points where the axle is bent upward. The troughs *a* and *b* are supported in operative positions by the spring-hangers 13 and 14. The arms 13 are attached rigidly to the wings 15 and to the links 16, which links are attached to the hooks 13' on the frame-pieces 4 and 5. The hangers 14 are attached in the same manner to the hooks 14' on the frame-pieces 4 and 5 and also rigidly attached to the wings 15 of the troughs *a* and *b*. The wings 15 are intended to prevent insects from escaping to one side of the machine. In this manner the troughs have a slight swinging motion. The yielding motion of the troughs *a* and *b* and the rubber strips 1 will prevent injury to the growing plants. Spring-arms 17 are provided for bringing the troughs back to their normal positions when for any reason or cause the troughs are sprung out of their normal positions. The arms 17 are attached to the frame-pieces 3 and 6 and rest against the wings 15. The arms 17 also rest against spiral springs 18, which are mounted on rods 17', which are adjustably attached to the bars 12'. The rods 17', on which the spiral springs 18 are mounted, move loosely through the arms 17, and the springs 18 are compressed between the arms 17 and the bars 12'. The nuts 18' on rods 17' may be screwed farther on or off to vary the tension of the springs 18, and suitable washers 41 and sleeves 42 are mounted on rods 17' to coöperate with nuts 18 against arms 17 to cause the arms 17 to hold the troughs at the desired distance apart. The wings 15 have flexible connections with the bars 12' by means of the links 15', as shown in Fig. 5. The effect of the springs 18 is to aid in throwing the troughs back to their normal position, and the links 15', together with the links to which the spring-hangers 13 and 14 are attached, permit a limited freedom of movement to the troughs. The troughs can thus run very close to the cotton-stalks without bruising the same.

Means are provided for agitating the cotton-stalks as the troughs $a$ and $b$ are being passed under them. This consists of an agitator 18'', which is rotated while the machine is moving. The agitator has a plurality of removable fingers 19, which come in contact with the cotton-stalks and their branches as the agitator is rotated and moved along the row by the truck. The fingers 19 may be removed by taking out the bolts 40, so that the top casting 43 of the agitator will be loose. A sprocket-wheel 20 is attached to the wheel 8 and made rigid therewith by suitable arms 21, which engage the spokes of the wheel 8, and the hub of the sprocket-wheel is rigid with the hub of the wheel 8. A smaller sprocket-wheel 22 is mounted on shaft 23, which is journaled on the frame-pieces 5 and 6. The sprocket-chain 24, driven by wheel 20, drives the sprocket-wheel 22. A bevel gear-wheel 25 is mounted on shaft 23, and a bevel gear-wheel 26 is mounted on the vertical shaft of the agitator 18'', suitable bearings being provided for shaft 23 on the frame-pieces 5 and 6. The shaft 27 of the agitator 18'' is journaled in a spider-bearing, which has arms 27', bent up to engage the frame-pieces 4 and 5 and which is bolted to these frame-pieces. It is thus seen that the agitator may be rotated as the truck is moved and that the motive power for driving the agitator consists of a sprocket-wheel with suitable gearing actuated by the truck-wheels. An idler 30 may regulate the tension of the sprocket-chain 24. Means are provided for creating a constant downward blast, preferably behind, by the agitator 18''. A pulley-wheel 28 is mounted on shaft 23. A rotary fan 31 is mounted on shaft 32, which is journaled on the frame-pieces 4 and 5. A pulley 33 is mounted on shaft 32. A band 34 drives the pulleys 28 and 33. When the wheel 28 is driven, the fan 31 is driven and a blast downward is created. The speed of the fan 31 may be determined by the size of the wheels 28 and 33 and by the speed of the truck. A suitable seat 35 may be mounted on the frame-pieces 4 and 5 by means of braces and supports 36, which are bolted to these frame-pieces.

The operation of the machine is fully described above. Suitable liquid poison is placed in the troughs $a$ and $b$ for killing the insects. Kerosene-oil has been found effective for this purpose. Crude petroleum has also been found efficient for killing insects with this machine. The agitator and the fan mounted on the truck shake the insects down, and they fall in the liquid poison and are killed thereby.

The truck may be propelled in any suitable manner. The drawings show a tongue 37, which is broken away, for supporting the front part of the truck when it is drawn by horses or other animals. The machine is preferably drawn by two horses or mules, one horse walking on each side of the row of cotton.

Having fully described our invention, what we claim as new, and desire to secure by Letters Patent, is—

1. An insect-destroying machine comprising a wheeled truck carrying troughs flexibly connected thereto and adapted to reach under growing plants as said truck passes over the plants, said troughs having flexible strips on their inner edges, and means for agitating the plants as said truck is passed over them.

2. An insect-destroying machine comprising a wheeled truck carrying a pair of troughs flexibly connected thereto and adapted to reach under each side of a row of the plants, means for agitating the plants, and means for forcing the insects from among the plants down into said troughs.

3. An insect-destroying machine comprising a wheeled truck carrying troughs flexibly connected thereto, means for holding said troughs yieldingly in close proximity to each row of plants, means for agitating the plants, and means for forcing the insects from said plants into said troughs.

4. An insect-destroying machine comprising a wheeled truck carrying troughs flexibly connected thereto and adapted to reach under the plants, a rotary fan for forcing insects from the plants into said troughs, means for permitting said troughs to yield to pressure, and means for returning said troughs to their normal position.

5. In a device of the character indicated, troughs and yielding strips attached to the edges of said troughs to prevent the bruising of the growing plants by said troughs.

6. In a device of the character indicated troughs and yielding strips of the character of rubber attached to the adjacent edges of said troughs and projecting beyond the edges of said troughs.

7. In a device of the character indicated troughs and yielding strips attached to the inner edges of said troughs and projecting beyond the edges of said troughs and being inclined to aid in throwing insects in said troughs.

8. An insect-destroying machine comprising a wheeled truck, troughs hung thereon and swinging in close proximity to each other, a rotary fan for forcing insects from the plants into said troughs, and springs attached to said truck adapted to hold said troughs yieldingly in their normal position and capable of forcing said troughs back to their normal positions.

9. An insect-destroying machine comprising a truck having an arched axle, wheels supporting said axle, a frame mounted on and connected to said axle, means for bracing said frame consisting of castings mounted on said axle, braces attached to said frame and to said castings, swinging troughs supported by said frame, and means for forcing insects from the plants into said troughs.

10. An insect-destroying machine comprising a wheeled truck, a pair of troughs flexibly connected to said truck, spring-arms attached to said truck and pressing normally against the outside parts of said troughs, spiral springs adjustably mounted on said truck and pressing against said spring-arms, and means for forcing insects from growing plants into said troughs.

11. An insect-destroying machine comprising a wheeled truck, carrying troughs adjustably connected thereto, a rotary agitator and a rotary fan mounted on said truck, and suitable driving-gear for said agitator and fan operatively connected to one of the wheels of said trucks.

12. In a wheeled truck of the character described a rotary agitator provided with a vertical shaft, a spider-bearing for said shaft, bevel-gearing for driving said agitator, and gearing operatively connected to one of the wheels of said truck for driving said bevel-gearing.

13. In an insect-destroying machine of the character indicated a rotary agitator having a plurality of removable fingers mounted therein.

14. In an insect-destroying machine, a truck consisting of an arched axle, wheels supporting said axle, a frame attached to and supported on said axle, and means for destroying insects comprising troughs adapted to carry liquid poison flexibly connected to said frame and flexibly connected to said axle, and means for forcing the insects from the plants into said troughs.

15. In a device of the class described, the combination with suitable supporting means, of a pair of troughs suitably spaced apart and adjustable spacing means including a screw-threaded rod, a sleeve upon the latter, springs disposed between the ends of said sleeve and the adjacent parts of the troughs, and nuts upon the ends of the screw-threaded rods.

16. In a device of the class described, a supporting-frame, a pair of gathering-troughs, flexible supporting means for said troughs connected with the frame, and stalk-engaging means upon the inner adjacent edges of said members.

17. An insect-destroying machine comprising a wheeled truck, a pair of troughs flexibly connected to said truck and provided with upwardly-projecting wings on their outer edges, spring-arms attached to said truck and pressing normally against said wings and the outside parts of said troughs, spiral springs adjustably mounted on said truck and pressing against said spring-arms, and means for forcing insects from growing plants into said troughs.

In testimony whereof I have set my hand, in the presence of two witnesses, this 8th day of March, 1904.

JOHN S. DOAK.

In presence of—
A. L. JACKSON,
L. T. KNIGHT.

In testimony whereof I have set my hand, in the presence of two witnesses, this 10th day of March, 1904.

ALEXANDER G. FARRINGTON.

In presence of—
ED. B. CARRUTH,
CARL PRICE.